March 13, 1934.  E. A. ARONSON  1,950,912
GAUGE
Filed Feb. 23, 1933
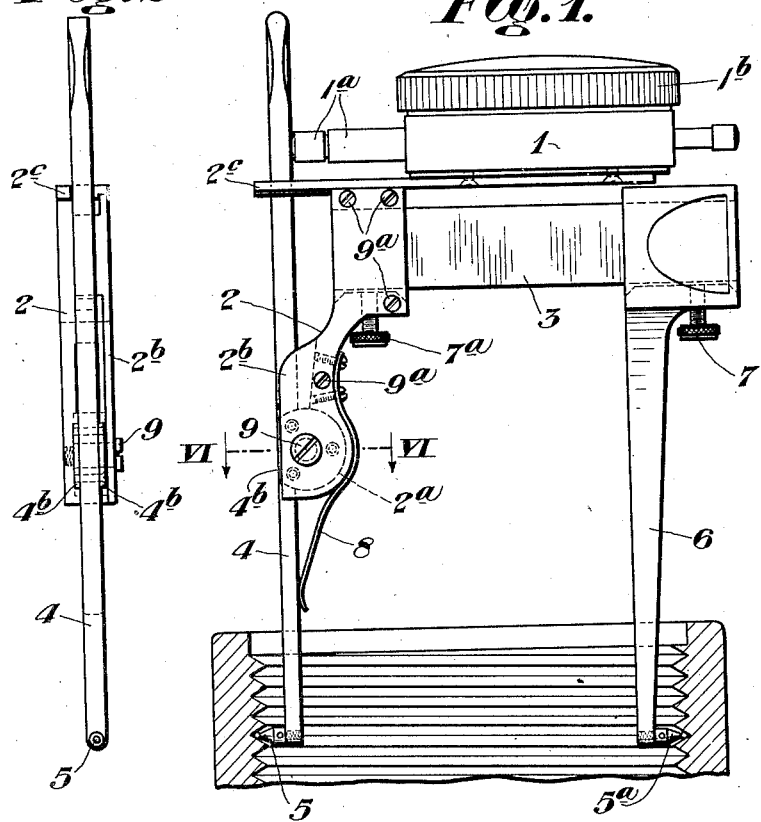
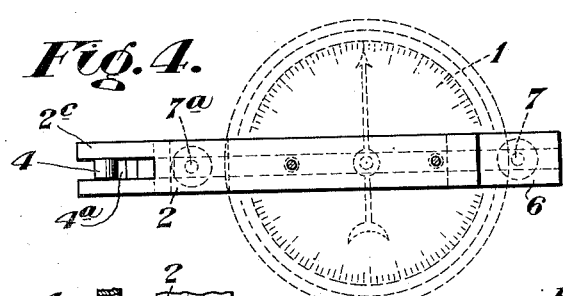
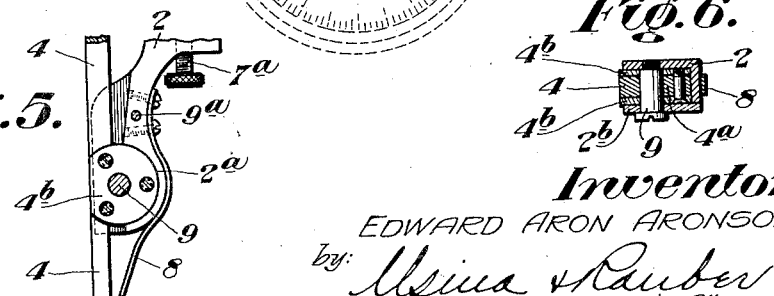
Inventor:
EDWARD ARON ARONSON,
by: Usina & Rauber
his Attorneys.

Patented Mar. 13, 1934

1,950,912

UNITED STATES PATENT OFFICE 1,950,912

GAUGE

Edward Aron Aronson, Gary, Ind., assignor to National Tube Company, a corporation of New Jersey Application February 23, 1933, Serial No. 657,981

2 Claims. (Cl. 33—148)

This invention relates to gauges, one of the objects being to accurately measure internal diameters. Other objects may be inferred from the following disclosure of the invention in a form particularly adapted to gauge the internal thread of a pipe coupling.

Referring to the accompanying drawing:

Figure 1 is a side view.

Figures 2 and 3 are views of details on opposite ends of Figure 1.

Figure 4 is a top view.

Figure 5 is an opened view of details in Figure 1.

Figure 6 is a cross-section view from the line VI—VI in Figure 1.

Figure 7 is a separated detail view from Figure 1.

One way of gauging the thread of a pipe coupling is by means of a stem operated indicator. However, it can not be used to gauge a coupling having an inside diameter less than the distance between its operating stems. The present invention enables its use with practically any sized coupling.

Such an indicator 1 is fastened to a frame 2 by means of small screws which engage the former's back.

This frame 2 mounts a bar 3. It also mounts a swinging finger 4 whose remote extremity is provided with a point 5 and whose upper portion engages an operating stem 1ᵃ of the indicator 1.

The bar 3 slidably mounts a fixed finger 6 whose lower extremity is also provided with a point 5ᵃ. This finger may be locked at various points apart from the swinging finger by means of a thumbscrew 7.

The frame 2 may slidably mount the bar 3 and be provided with a thumbscrew 7ᵃ for locking it in position. This enables the substitution of bars of different lengths when desirable. Also, the frame mounts a flat spring 8 which presses against a lower portion of the finger 4 with a force which slightly overbalances the push of the indicator's operating stem 1ᵃ.

It is to be understood that the indicator 1 is a commercial product and that its operating stems are urged outwardly by one or more springs forming part of its operating mechanism. Also, that its indicating dial may be turned by a knurled ring 1ᵇ so that the zero can be registered with its pointer.

In operation, the finger 6 is adjusted on the graduated bar 3 according to the inside diameter of the particular coupling to be gauged. The fingers 4 and 6 are then inserted in the coupling so their points 5 and 5ᵃ engage diametrically opposite hollows of the threads. This is done several times at different places within the coupling and the readings of the indicator 1 noted. Thus, a measure of the comparative internal diameters of the coupling is obtained and its taper angle or variances indicated. The indicator's dial is, of course, initially set to zero position.

The particular mounting of the swinging finger 4 is important because any looseness might introduce inaccuracies.

This mounting is by way of a circular projection 4ᵃ forming an integral part of the finger 4. It is somewhat more than a semicircle, and fits in a similarly shaped recess 2ᵃ in the frame 2. Thus, the wearing surfaces are along the edges of the projection 4ᵃ and the recess 2ᵃ, instead of being restricted to a pivoting pin.

Bearing plates 4ᵇ are secured on either side of the projection 4ᵃ by small screws. In addition, they increase the edge-contacting surface area.

A plate 2ᵇ retains these parts in place and incidentally forms part of the mounting for the bar 3. The frame 2 is further provided with a forked end 2ᶜ which encompasses the upper end of the finger 4 so it is held in engagement with the operating stem 1ᵃ of the indicator 1, and also protects the finger's mounting to some extent.

The above construction provides for wear at practically all places it might possibly occur. The points 5 and 5ᵃ are screw-mounted and may be removed when worn or damaged.

Preferably, the upper portion of the finger 4 projects sufficiently to form a finger hold, whereby the finger's lower end may be easily swung towards the other finger to permit free insertion in the coupling. The mounting for the finger 4 is further strengthened by a screw-pin 9 which, with the screws 9ᵃ, mounts the plate 2ᵇ to the frame 2.

While I have shown and described one specific form of this invention in accordance with the patent statutes, it is not intended to limit the scope of the invention exactly thereto, except as defined by the following claims.

I claim:

1. A gauge including an indicator and fixed and swinging fingers operatively associated therewith, the mounting for said swinging finger including the combination of a circular projection thereon which exceeds a semicircle, bearing plates shaped substantially like said projection and removably fixed to both sides thereof in registration therewith, a frame having a recess shaped to laterally receive said projection and bearing plates and means for holding said projection and bearing plates in said recess.

2. A gauge including the combination of an indicator having an operating stem urged outwardly, a frame fastened to the back of said indicator, a bar mounted by said frame, a fixed finger slidably mounted by said bar and provided with locking means, a swinging finger mounted by said frame and including a portion engaging the operating stem of said indicator, and a spring engaging said finger and urging it to engage said operating stem with a force slightly overbalancing the latter's outward urge, the mounting for said swinging finger including the combination of a circular projection thereon which exceeds a semicircle, bearing plates shaped substantially like said projection and removably fixed to both sides thereof in registration therewith, said frame having a recess shaped to laterally receive said projection and bearing plates, and means for holding said projection and bearing plates in said recess.

EDWARD ARON ARONSON.